March 7, 1939.   C. GIRL ET AL   2,149,597
ILLUMINATED VEHICLE MIRROR
Filed June 24, 1936
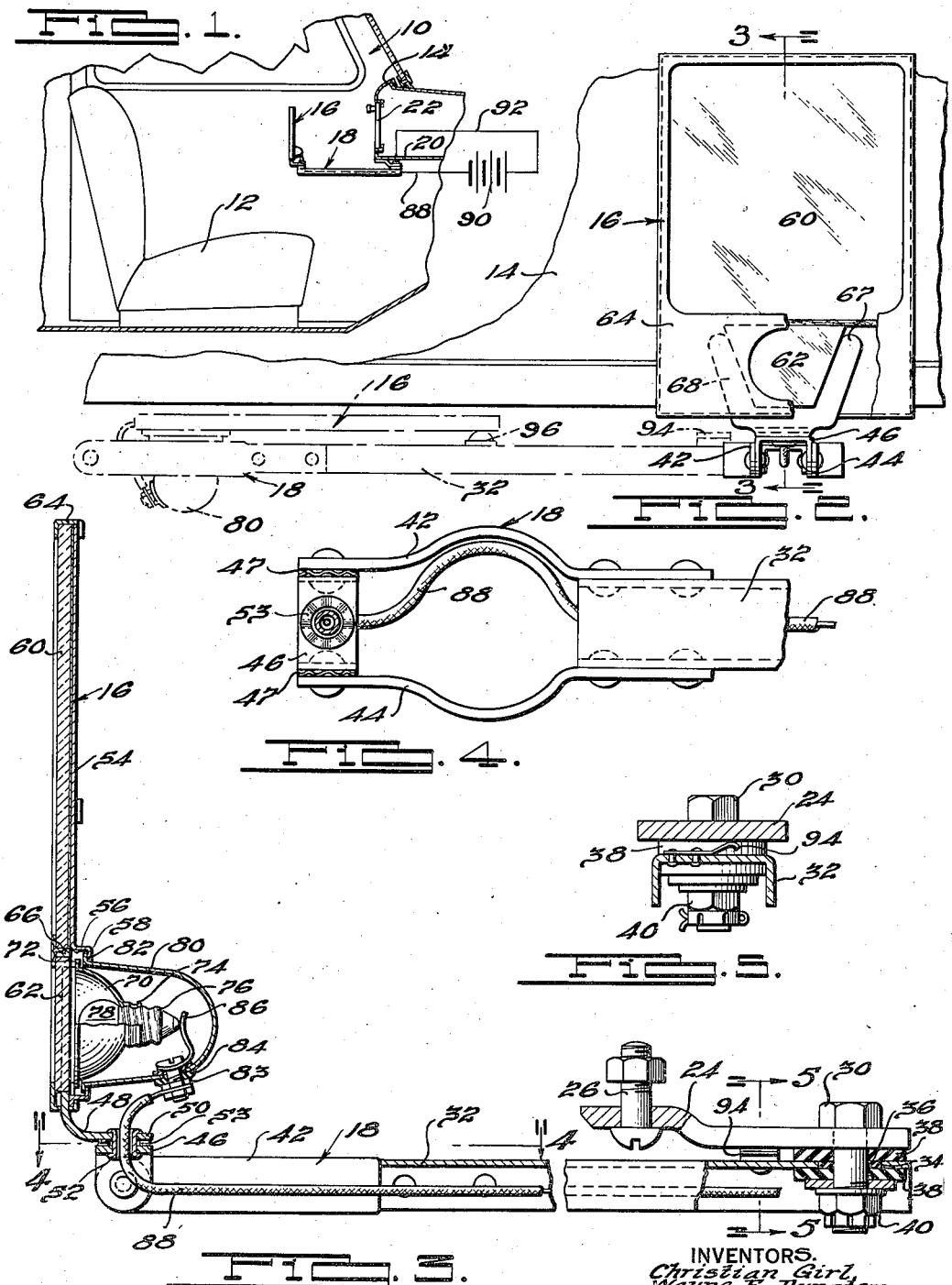
INVENTORS.
Christian Girl,
Wayne E. Dunston,
BY Stuart H. Caldwell.
Harness, Dickey, Pierce & Hann
ATTORNEYS.

Patented Mar. 7, 1939

2,149,597

UNITED STATES PATENT OFFICE 2,149,597

ILLUMINATED VEHICLE MIRROR

Christian Girl, Wayne E. Dunston, and Stuart H. Caldwell, Detroit, Mich., assignors to Kelch Heater Co., a corporation of Michigan Application June 24, 1936, Serial No. 86,948

5 Claims. (Cl. 240—4.2)

This invention relates to accessories for automobiles and in particular relates to an illuminated mirror mounted under the instrument panel of an automobile.

Objects of the invention are to provide an illuminated mirror mounted under the instrument panel of an automobile so that it is readily accessible for use and when not in use is not visible to occupants of the car; to provide a mounting for an illuminated mirror in an automobile of such a character that the mirror is pivotally and/or universally supported thereon; to provide a mounting for an illuminated mirror having an automatic switch associated therewith of such a character that when the mirror is positioned for use, the lamp will automatically light and when the mirror is returned to its out-of-the-way position the lamp will be automatically extinguished; to provide a mounting for an illuminated mirror under the instrument panel of an automobile in the form of a pivoted arm, with the mirror universally mounted on the outer end of the arm; and to provide an improved rugged and compact construction relatively inexpensive to manufacture and simple in operation.

Other objects of the invention will become apparent from the following specification, the drawing relating thereto, and from the claims hereinafter set forth.

In the drawing, in which like numerals are used to designate like parts in the several views throughout:

Figure 1 is a fragmentary, partially broken, partially sectioned side view, showing the interior of an automobile embodying features of the present invention;

Fig. 2 is a slightly enlarged fragmentary front elevational view, with parts broken away, illustrating the illuminated mirror and mounting therefor shown in Fig. 1;

Fig. 3 is an enlarged side elevational view, part in cross-section, taken substantially along the line 3—3 of Fig. 2;

Fig. 4 is a top plan view, taken substantially along the line 4—4 of Fig. 3; and Fig. 5 is a cross-sectional view, taken substantially along the line 5—5 of Fig. 3.

It is recognized that illuminated mirrors are old and that it is old to mount illuminated mirrors on the front faces of instrument panels of automobiles, but in such constructions the mirror is visible to the occupants of the car and is in such a position that it not only mars the attractiveness of the instrument panel but is also subject to breakage and damage, as it is not adequately protected.

In the present invention, an illuminated mirror is mounted out of the way and out of the normal vision of occupants of the car on a pivoted arm under the instrument panel of an automobile. By so mounting the mirror, when not in use it will not be subjected to damage or destruction, as is possible in prior constructions. It is preferable to mount the mirror under the glove box on the instrument panel, where such is present, as in such a position it is readily accessible to occupants of the car without interfering with the other necessary instruments of the automobile on the instrument panel, and in the present construction by having the mirror universally mounted on one end of the pivoted arm, the mirror may be pulled out to a position before the user and the mirror adjusted to the desired position and supported in that position by the pivoted arm, leaving both hands of the user free.

In the present invention, the mirror section and the light diffusing section with the lamp behind it, are separated from each other, so that the light from the lamp cannot shine on the mirror which otherwise would cause a glare and distort the image of the user.

Also in the present invention an automatic switch is provided in the lamp circuit of such a construction that when the mirror is pulled out from under the instrument panel, the switch operates to automatically close the lamp circuit, and when the mirror is re-inserted under the instrument panel, the switch automatically operates to open the lamp circuit.

For a better understanding of the invention, reference may be had to the drawing, and in Fig. 1 the interior of an automobile body 10 adjacent the front seat 12 is illustrated, having an instrument panel 14 in the usual position. An illuminable mirror 16 is universally supported on the end of a supporting arm 18 which is pivotally mounted on the under-side 20 of the instrument panel, preferably directly under a glove box 22.

Referring now to Figs. 2 to 5 for further details of the mirror and mounting construction, a bracket 24 is fixedly secured to the under-side 20 of the instrument panel by suitable means, such as bolts and nuts 26 adjacent the front of the bracket. The bracket 24 is inwardly directed under the instrument panel and is provided with an opening adjacent its inner end through which a pivot bolt 30 passes and upon which an extension arm 32, which is an element of the support 18, is pivotally mounted. The extension arm 32 comprises a downwardly opening elongated channel member having an opening 34 adjacent its inner end within which an insulating washer 36 seats. The pivot pin 30 passes through the opening in the washer 36, and the extension arm 32 is pivotally mounted with respect to the bracket 24, but is electrically insulated therefrom and from the bracket 24 by means of insulating washers 38 on the top and bottom surfaces of the arm, the extension arm being held against displacement on the pivot pin by means of the lock nut and washer 40.

End extension arms 42 and 44 are suitably secured, as by riveting or the like, to the sides of the extension arm 32 at the outer end thereof, the arms 42 and 44 being bowed outwardly intermediate their ends and provided with openings adjacent their outer ends between which a U-shaped bracket 46 is pivotally mounted with ridged washers 47 interposed between the sides of the bracket and the inner sides of the extension arms. The illuminable mirror 16 is pivotally supported on the bracket 46 about an axis substantially normal to the pivot axis of the bracket 46 by means of a supporting bracket 48. As shown in Fig. 3, the bracket 48 has a substantially straight horizontal portion 50 having an opening therethrough in alignment with an opening in the bracket 46, the brackets 48 and 46 being secured relative to each other by means of a tubular rivet 52. The adjacent faces of the brackets 46 and 48 are separated from each other by means of a ridged washer 53, the brackets being held together by the connection and the resiliency of the ridges on the washer holds the mirror in an adjusted position when turned about the axis of the member 52. The arms 42 and 44 frictionally engage the sides of the bracket 46 with the ridged washers 47 therebetween so that, upon tilting the mirror about its horizontal axis, the mirror will remain in the tilted or adjusted position, and when rotated about its vertical axis, the washers will insure the mirror's remaining in such turned position. It is evident, in mounting the mirror for rotation about the two axes, that a universal movement of the mirror relative to the supporting arm is permitted.

The illuminable mirror 16 comprises a back 54 having a substantially central opening 56 adjacent its lower end, the opening 56 having a rearwardly and inwardly projecting annular portion 58. A silvered mirror 60 and a light diffusing glass member 62 preferably of frosted glass, are held in place on the back 54 by means of a mirror frame 64. The mirror 60 and the glass member 62 are separated from each other by means of a transverse member 66 upon which the mirror 60 is supported, so that light will not shine behind or into the edge of the mirror surface. The glass member 62 is supported on the bracket 48 between the spaced prong members 67 and 68, the prong members and the upturned portion of the bracket fitting within an opening in the base of the frame 64 and supporting the mirror. Openings are provided in the mirror frame 64 to expose the front faces of the mirror 60 and glass 62.

A metallic reflector 70 having an outwardly directed annular flange 72 is mounted within the opening 56 directly behind the glass 62 and is provided with a base portion 74 centrally at the rear, in which the base 76 of a lamp bulb 78 is adapted to be screwed. A cup-shaped metallic member 80 has an outwardly directed annular flange 82 which cooperates with the flange 58 of the opening 56 and encloses the reflector 70 and light bulb 78 therein.

The cup-shaped member 80 is provided with an opening adjacent its bottom through which an electrical contact element 83 projects, and is electrically insulated from the cup-shaped member 80 by means of an insulating bushing 84 which fits within the opening of the member 80. The contact element 83 is provided with a spring contact member 86 adjacent its inner end, which is in electrical contact with one end of the filament of the lamp.

Electrical conductor wire 88 is suitably electrically connected to the outer end of the element 83 and at its other end is connected to one terminal of a battery 90. The opposite terminal of the battery 90 is suitably grounded, preferably to the under-side 20 of the instrument panel, by means of an electrical conductor 92.

An electrical switch, which automatically opens and closes the circuit as the mirror is moved to and from position under the instrument panel, is provided in the form of a spring clip 94, which is suitably secured, as by riveting, to the top side of the extension arm 32 immediately under the bracket 24 adjacent the pivot pin 30.

When the mirror and extension arm are in the out of the way position, as indicated by the dotted lines in Fig. 2, it can be seen that the spring contact clip 94 is free of contact with the bracket 24, and it is evident that when the arm 32 is pivoted about the pin 30 to move the mirror to a position in use, the spring contact clip 94 is turned to such a position that it contacts the under face of the bracket 24, as indicated in Figs. 3 and 5, thereby grounding the bracket and completing the lamp circuit.

In further detail, the lamp circuit may be traced from one end of the battery 90 through the conductor 88 to one end of the lamp element, the other end of the lamp element being grounded to the reflector 70 through its base, and as the reflector is grounded to the extension arm 32 and the opposite terminal of the battery 90 is grounded to the bracket 24 through the conductor 92 and the under-side 20, contact between the spring clip 94 and the bracket 24 will ground the extension arm 32 to the bracket 24, completing the lamp circuit.

As indicated by the dotted lines in Fig. 2, it is preferable to provide a rubber knob 96 on the top plate of the extension arm 32 to support the rear of the mirror adjacent the top edge when the mirror is in position under the instrument panel to free the mirror of shock from jarring and thereby reduce the danger of damage to the mirror. As is also shown by the dotted lines in Fig. 2, when in position under the instrument panel, the cup-shaped member 80 fits between the bowed out intermediate portions of the members 42 and 44, which provides a compact structure and protects the cup against possible damage.

Formal changes may be made in the specific embodiments of the invention described without departing from the spirit and substance of the invention, the scope of which is commensurate with the appended claims.

We claim as our invention:

1. An accessory for automobiles comprising an elongated movable supporting arm pivotally mounted at its inner end about a vertical axis on the underside of the instrument panel of said automobile, and an illuminated mirror, including a lamp, pivotally mounted for movement about a horizontal axis on the outer end of said supporting arm, a switch member electrically connected to said lamp mounted adjacent the inner end of said arm and movable therewith, and a second switch member fixedly mounted to the under-side of said instrument panel, the construction and arrangement being such that upon movement of said arm out from position under the panel, the switch members engage closing the lamp circuit and upon return of said arm to position under the panel, the switch members disengage, opening the circuit.

2. An accessory for automobiles comprising a bracket adapted to be mounted upon the under-side of the instrument panel of said automobile, a movable supporting arm pivotally mounted at its inner end about a vertical axis on the under-side of said bracket, an illuminated mirror, including a lamp, pivotally mounted for movement about a horizontal axis on the outer end of said supporting arm, and a switch member electrically connected to said lamp mounted adjacent the inner end of said arm and movable therewith, the construction and arrangement being such that upon movement of said arm out from position under the panel, the switch members and the bracket engage, closing the lamp circuit and, upon return of said arm to position under the panel, the switch members and the bracket disengage, opening the circuit.

3. An accessory for automobiles comprising a supporting arm pivotally mounted at its inner end about a vertical axis on the under-side of the instrument panel of said automobile, said arm including side members bowed outwardly intermediate their ends, an illuminated mirror, including a lamp, pivotally mounted about a horizontal axis adjacent the ends of said members, and a cup shaped member mounted on the back of said mirror and enclosing said lamp, the construction and arrangement being such that the cup-shaped member fits between the bowed out portions of said members when the mirror is pivoted downwardly about its horizontal axis.

4. An accessory for automobiles comprising a supporting arm, means adapted to pivotally mount the inner end of said arm about a vertical axis to the under-side of a substantially horizontal supporting panel so that the arm lies substantially flush with the panel, an illuminated mirror including a lamp, and means adjustably pivotally mounting said mirror to the outer end of said arm so that said mirror lies in substantially the plane of movement of the arm when the arm is under the panel, the construction and arrangement of said mirror including the lamp and the arm relative to each other and to the supporting panel being such that said mirror including the lamp and the arm are normally located out of normal vision under the supporting panel.

5. An accessory for automobiles comprising a supporting arm, means adapted to pivotally mount the inner end of said arm about a vertical axis to the under-side of a substantially horizontal supporting panel so that the arm lies substantially flush with the panel, an illuminated mirror including a lamp, and means adjustably universally mounting said mirror to the outer end of said arm so that said mirror lies in substantially the plane of movement of the arm when the arm is under the panel, the construction and arrangement of said mirror including the lamp and the arm relative to each other and to the supporting panel being such that said mirror including the lamp and the arm are normally located out of normal vision under the supporting panel.

CHRISTIAN GIRL.
WAYNE E. DUNSTON.
STUART H. CALDWELL.